(12) United States Patent
Nakamura

(10) Patent No.: US 10,805,581 B2
(45) Date of Patent: Oct. 13, 2020

(54) IMAGE SENSOR AND IMAGING APPARATUS

(71) Applicant: CANON KABUSHIKI KAISHA, Tokyo (JP)

(72) Inventor: Keita Nakamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/589,517

(22) Filed: Oct. 1, 2019

(65) Prior Publication Data

US 2020/0036946 A1 Jan. 30, 2020

Related U.S. Application Data

(63) Continuation of application No. PCT/JP2018/011627, filed on Mar. 23, 2018.

(30) Foreign Application Priority Data

Apr. 7, 2017 (JP) .................................. 2017-077148

(51) Int. Cl.
*H04N 9/04* (2006.01)
*H04N 9/07* (2006.01)
(Continued)

(52) U.S. Cl.
CPC ......... *H04N 9/0451* (2018.08); *H04N 9/0455* (2018.08); *H04N 9/07* (2013.01)

(58) Field of Classification Search
CPC ............... H04N 9/0451; H04N 9/0455; H04N 9/04555; H04N 9/07; H04N 5/3696;
(Continued)

(56) References Cited

U.S. PATENT DOCUMENTS 8,130,293 B2 * 3/2012 Kanamori ............. H04N 9/083
348/280
10,122,951 B2 11/2018 Takado
(Continued)

FOREIGN PATENT DOCUMENTS

JP 2010263158 A 11/2010
JP 2012212978 A 11/2012
(Continued)

OTHER PUBLICATIONS

International Search Report issued in Intl. Appln. No. PCT/JP2018/011627 dated May 1, 2018. English translation provided.
(Continued)

*Primary Examiner* — Marly S Camargo
(74) *Attorney, Agent, or Firm* — Rossi, Kimms & McDowell LLP

(57) ABSTRACT

An image sensor includes a plurality of first pixel groups each having a main sensitivity to light of a corresponding one of a plurality of wavelength bands, and a second pixel group having the main sensitivity to a wavelength band including the plurality of wavelength bands. Each of the plurality of first pixel groups and the second pixel group includes a plurality of polarization pixel groups having the main sensitivity to each of polarization components having three or more polarization azimuths. A ratio of the number of pixels in the plurality of polarization pixel groups in the second pixel group to a total number of pixels on the image sensor is larger than a ratio of the number of pixels in the plurality of polarization pixel groups in each of the plurality of first pixel groups to the total number of pixels.

9 Claims, 7 Drawing Sheets

SQUARE ARRAY PATTERN

(51) Int. Cl.
*H04N 5/374* (2011.01)
*H04N 5/369* (2011.01)
*G02B 5/20* (2006.01)
*G02B 5/30* (2006.01)
*H01L 27/146* (2006.01)

(58) Field of Classification Search
CPC ........... H04N 5/3745; H04N 2209/046; G02B 5/201; G02B 5/3058; H01L 27/146; H01L 27/14621; H01L 27/14623; H01L 27/14625; H01L 27/14645; H01L 27/1463
USPC ..... 348/273, 57, 58, 222.1, 224.1, 270, 290, 348/42, 360, 294, 302, 308; 250/208.1, 250/341.3, 559.09, 227.19, 225, 550, 226, 250/482; 257/291, 292, 98, 294; 382/210, 211, 260, 261–265
See application file for complete search history.

(56) References Cited

U.S. PATENT DOCUMENTS

| | | | |
|---|---|---|---|
| 10,403,665 B2 | 9/2019 | Yokogawa | |
| 10,425,624 B2 | 9/2019 | Honda | |
| 2009/0290039 A1* | 11/2009 | Kanamori | H04N 5/228 348/222.1 |
| 2010/0253820 A1* | 10/2010 | Kanamori | H04N 9/04 348/280 |
| 2012/0075513 A1* | 3/2012 | Chipman | H04N 5/335 348/302 |
| 2013/0188023 A1* | 7/2013 | Kuang | H04N 13/02 348/49 |
| 2013/0270421 A1* | 10/2013 | Kanamori | H01L 27/146 250/208.1 |
| 2015/0206912 A1* | 7/2015 | Kanamori | H01L 27/146 250/208.1 |
| 2016/0269694 A1 | 9/2016 | Masuda | |
| 2017/0221949 A1* | 8/2017 | Yokogawa | H01L 27/146 250/208.1 |
| 2018/0302597 A1* | 10/2018 | Honda | H04N 9/04 348/294 |
| 2020/0013819 A1* | 1/2020 | Toda | H01L 27/146 257/291 |

FOREIGN PATENT DOCUMENTS

| | | |
|---|---|---|
| JP | 5428509 B2 | 2/2014 |
| JP | 2016025626 A | 2/2016 |
| JP | 2016171368 A | 9/2016 |
| JP | 2016219977 A | 12/2016 |
| JP | 2017005111 A | 1/2017 |

OTHER PUBLICATIONS

Written Opinion issued in Intl. Appln. No. PCT/JP2018/011627 dated May 1, 2018.

English translation of Written Opinion issued in Intl. Appln. No. PCT/JP2018/011627 dated May 1, 2018, previously cited in IDS filed Oct. 1, 2019.

International Preliminary Report on Patentability issued in Intl. Appln. No. PCT/JP2018/011627 dated Oct. 17, 2019. English translation provided.

* cited by examiner

COLOR FILTER ARRAY 122

POLARIZING FILTER ARRAY 123

SQUARE ARRAY PATTERN

| W1 | R1 | W1 | G2 | W1 | B3 | W1 | R1 | W1 | G2 | W1 | B3 |
|----|----|----|----|----|----|----|----|----|----|----|----|
| W2 | W3 | W2 | W3 | W2 | W3 | W2 | W3 | W2 | W3 | W2 | W3 |
| W1 | G3 | W1 | B1 | W1 | R2 | W1 | G3 | W1 | B1 | W1 | R2 |
| W2 | W3 | W2 | W3 | W2 | W3 | W2 | W3 | W2 | W3 | W2 | W3 |
| W1 | B2 | W1 | R3 | W1 | G1 | W1 | B2 | W1 | R3 | W1 | G1 |
| W2 | W3 | W2 | W3 | W2 | W3 | W2 | W3 | W2 | W3 | W2 | W3 |
| W1 | R1 | W1 | G2 | W1 | B3 | W1 | R1 | W1 | G2 | W1 | B3 |
| W2 | W3 | W2 | W3 | W2 | W3 | W2 | W3 | W2 | W3 | W2 | W3 |
| W1 | G3 | W1 | B1 | W1 | R2 | W1 | G3 | W1 | B1 | W1 | R2 |
| W2 | W3 | W2 | W3 | W2 | W3 | W2 | W3 | W2 | W3 | W2 | W3 |
| W1 | B2 | W1 | R3 | W1 | G1 | W1 | B2 | W1 | R3 | W1 | G1 |
| W2 | W3 | W2 | W3 | W2 | W3 | W2 | W3 | W2 | W3 | W2 | W3 | y → x

| W1 | R1 | W3 | B2 | W1 | R3 | W3 | B4 |
|----|----|----|----|----|----|----|----|
| G1 | W2 | G4 | W4 | G1 | W2 | G4 | W4 |
| W3 | B1 | W1 | R2 | W3 | B3 | W1 | R4 |
| G2 | W4 | G3 | W2 | G2 | W4 | G3 | W2 |
| W1 | R3 | W3 | B4 | W1 | R1 | W3 | B2 |
| G1 | W2 | G4 | W4 | G1 | W2 | G4 | W4 |
| W3 | B3 | W1 | R4 | W3 | B1 | W1 | R2 |
| G2 | W4 | G3 | W2 | G2 | W4 | G3 | W2 |

FIG. 9

| W4 | W3 | W4 | W3 | W4 | W3 |
|----|----|----|----|----|----|
| W2 | R1 | W2 | W1 | B2 | W1 |
| W4 | W3 | W4 | W3 | W4 | W3 |
| W2 | W1 | W2 | W1 | W2 | W1 |
| W4 | B3 | W4 | W3 | R4 | W3 |
| W2 | W1 | W2 | W1 | W2 | W1 |

FIG. 10

| G1 | W1 | G2 | W2 | G3 | W1 | G1 | W2 | G2 | W1 | G3 | W2 |
|----|----|----|----|----|----|----|----|----|----|----|----|
| W  | R  | W3 | R  | W  | R  | W3 | R  | W  | R  | W3 | R  |
| B3 | W2 | B1 | W1 | B2 | W2 | B3 | W1 | B1 | W2 | B2 | W1 |
| W3 | G  | W  | G  | W3 | G  | W  | G  | W3 | G  | W  | G  |
| R2 | W1 | R3 | W2 | R1 | W1 | R2 | W2 | R3 | W1 | R1 | W2 |
| W  | B  | W3 | B  | W  | B  | W3 | B  | W  | B  | W3 | B  |
| G1 | W2 | G2 | W1 | G3 | W2 | G1 | W1 | G2 | W2 | G3 | W1 |
| W3 | R  | W  | R  | W3 | R  | W  | R  | W3 | R  | W  | R  |
| B3 | W1 | B1 | W2 | B2 | W1 | B3 | W2 | B1 | W1 | B2 | W2 |
| W  | G  | W3 | G  | W  | G  | W3 | G  | W  | G  | W3 | G  |
| R2 | W2 | R3 | W1 | R1 | W2 | R2 | W1 | R3 | W2 | R1 | W1 |
| W3 | B  | W  | B  | W3 | B  | W  | B  | W3 | B  | W  | B  |

FIG. 11

| B1 | G1 | B4 | G4 | B2 | G1 | B1 | G4 | B4 |
|----|----|----|----|----|----|----|----|----|
| R1 | W1 | R4 | W3 | B4 | W1 | R1 | W2 | R4 |
| B2 | G2 | B3 | G3 | B3 | G2 | B2 | G3 | B3 |
| R2 | W3 | R3 | W2 | W3 | W2 | R2 | W3 | R3 |
| G3 | B1 | G4 | W3 | W2 | W1 | G1 | B3 | G2 |
| R1 | W1 | R4 | W2 | W1 | W2 | R1 | W1 | R4 |
| B1 | G1 | B4 | G4 | R4 | G1 | B1 | G4 | B4 |
| R2 | W2 | R3 | W3 | B2 | W1 | R2 | W3 | R3 |
| B2 | G2 | B3 | G3 | R1 | G2 | B2 | G3 | B3 |

FIG. 12

IMAGE SENSOR AND IMAGING APPARATUS

CROSS-REFERENCE TO RELATED APPLICATIONS

This application is a Continuation of International Patent Application No. PCT/JP2018/011627, filed on Mar. 23, 2018, which claims the benefit of Japanese Patent Application No. 2017-077148, filed on Apr. 7, 2017, both of which are hereby incorporated by reference herein in their entirety.

BACKGROUND OF THE INVENTION

Field of the Invention

The present invention relates to an image sensor configured to acquire polarization information and an imaging apparatus using the same.

Description of the Related Art

A specific characteristic of an object can be highlighted and detected by observing a polarization state of light reflected on the object. For example, when a polarizing filter is attached to a front surface of a lens and an object image is captured by an imaging apparatus, the color, contrast, or other texture of the object can be highlighted, or a reflection of reflected light on the water surface etc. can be enhanced or reduced. An edge or a defective portion of an object can be detected by acquiring polarization components having different polarization azimuths from the object.

Japanese Patent No. ("JP") 5428509 discloses an image sensor that enables both color information and polarization information to be acquired by providing a color filter and a polarizing filter for each of a plurality of pixels. This image sensor enables polarization components in a plurality of polarization azimuths to be acquired by single imaging.

The image sensor disclosed in JP 5428509 distributes all colored pixels provided with color filters in a plurality of polarization azimuths. Hence, a ratio of a pixel for acquiring the polarization component of the same color and the same polarization azimuth is smaller than a ratio (such as one-third) of a pixel for each color to all pixels in the general image sensor having no polarizing filter. Thus, imaging using the image sensor disclosed in JP 5428509 causes the resolution of the obtained polarization information to be lower than those of imaging using the general image sensor in which a polarizing filter is attached to the front surface of the lens and the total number of pixels is the same.

SUMMARY OF THE INVENTION

The present invention provides an image sensor configured to acquire polarization information and color information at a high resolution, and an image sensor using the image sensor.

An image sensor with two-dimensionally arranged pixels according to one aspect of the present invention includes a plurality of first pixel groups each having a main sensitivity to light of a corresponding one of a plurality of wavelength bands, and a second pixel group having the main sensitivity to a wavelength band including the plurality of wavelength bands. Each of the plurality of first pixel groups and the second pixel group includes a plurality of polarization pixel groups having the main sensitivity to each of polarization components having three or more polarization azimuths. A ratio of the number of pixels in the plurality of polarization pixel groups in the second pixel group to a total number of pixels on the image sensor is larger than a ratio of the number of pixels in the plurality of polarization pixel groups in each of the plurality of first pixel groups to the total number of pixels.

An imaging apparatus according to another aspect of the present invention includes the above image sensor and a generator configured to generate image information using a signal output from the image sensor.

Further features of the present invention will become apparent from the following description of exemplary embodiments with reference to the attached drawings.

BRIEF DESCRIPTION OF THE DRAWINGS

FIG. 9 illustrates a pixel arrangement in a polarization color image sensor according to a second embodiment.

FIG. 10 illustrates a pixel arrangement in a polarization color image sensor according to a third embodiment.

FIG. 11 illustrates a pixel arrangement in a polarization color image sensor according to a fourth embodiment.

FIG. 12 illustrates a pixel arrangement in a polarization color image sensor according to a fifth embodiment.

DESCRIPTION OF THE EMBODIMENTS

Figure 1:
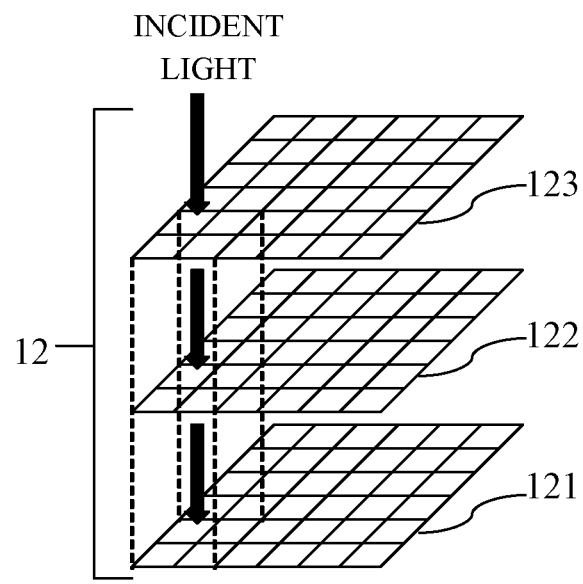
FIG. 1 illustrates an illustrative configuration of a polarization color image sensor according to one embodiment of the present invention.
Figure 2:
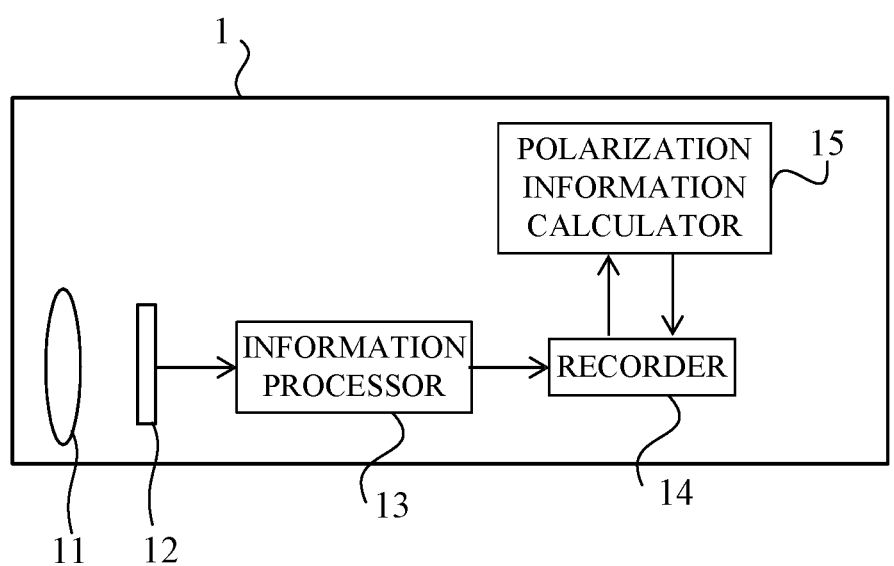
FIG. 2 illustrates a configuration of an imaging apparatus having the polarization color image sensor according to this embodiment.

Referring now to the accompanying drawings, a description will be given of embodiments according to the present invention. FIG. 1 illustrates a configuration of a polarization color image sensor 12 according to a representative embodiment of the present invention. FIG. 2 illustrates a configuration of an imaging apparatus 1 having the polarization color image sensor 12. The imaging apparatus 1 includes an imaging optical system 11, the polarization color image sensor 12, an information processor (generator) 13, a recorder 14, and a polarization information calculator 15. The imaging optical system 11 forms an object image as an optical image on the imaging plane of the polarization color image sensor 12.

The polarization color image sensor 12 has a pixel array 121 including a plurality of pixels two-dimensionally arranged on the imaging plane. The polarization color image sensor 12 can use a CCD type element, a CMOS type element or the like. In addition, the polarization color image sensor 12 includes a color filter array 122 including a plurality of two-dimensionally arranged color filters and a polarizing filter array 123 including a plurality of two-dimensionally arranged polarizing filters on the light receiving surface side of the pixel array 121. Thereby, the polarization color image sensor 12 has a polarizing and colored pixel array having a polarizing filter function and a color filter function.

In the configuration illustrated in FIG. 1, the polarizing filter array 123, the color filter array 122, and the pixel array 121 are arranged in this order from the light incident side in the polarization color image sensor 12. However, the color filter array 122, the polarizing filter array 123, and the pixel array 121 may be arranged in order from the light incident side.

Figure 3:
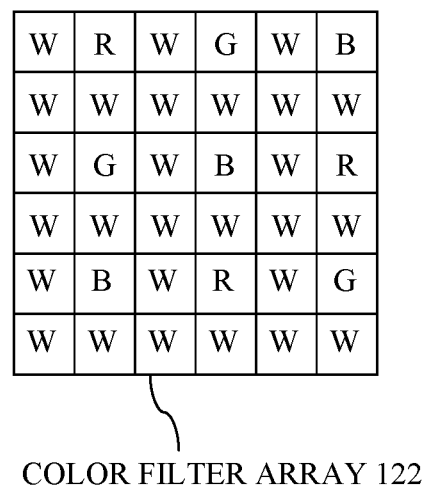
FIG. 3 illustrates an illustrative arrangement of color filters in the polarization color image sensor according to this embodiment.

FIG. 3 illustrates a specific example of the color filter array 122. The color filter array 122 includes color filters of three primary colors of R (red), G (green), and B (blue) and a color filter of W (white). These R, G, B, and W color filters are provided for any pixel in the pixel array 121.

R, G, and B color filters (referred to as "R filter," "G filter," and "B filter" respectively hereinafter) transmit light in partial wavelength bands that are different from each other in a use wavelength band of the polarization color image sensor 12 that transmits the W color filter (referred to as a "W filter" hereinafter). The use wavelength band is a wavelength band of light that is converted into an electrical signal that can be read by the polarized color image sensor 12 out of incident light to the polarized color image sensor 12. In this embodiment, the use wavelength band is the entire visible light range, but may contain an infrared light region, an ultraviolet region, and a combination thereof.

Figure 4:
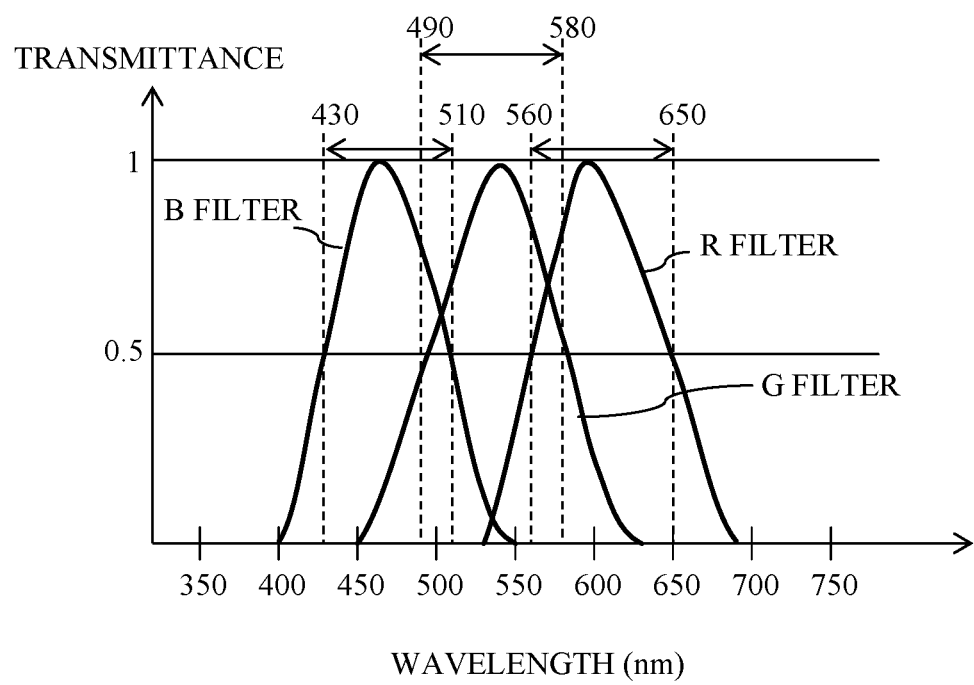
FIG. 4 is a graph showing a transmittance characteristic of the color filter according to this embodiment.

FIG. 4 illustrates an illustrative transmittance of each of the R, G, and B filters. Each of the R, G, and B filters has a higher transmittance for a corresponding one of the R, G, or B color lights than for the other color lights. The R filter selectively transmits red light or its transmittance exhibits half of its maximum transmittance or higher for a red wavelength band of about 560 nm to 650 nm. The G filter selectively transmits green light or its transmittance exhibits half of its maximum transmittance or higher for a green wavelength band of about 490 nm to 580 nm. The B filter selectively transmits blue light or its transmittance exhibits half of its maximum transmittance or higher for a blue wavelength band of about 430 nm to 510 nm. The W filter transmits light in the use wavelength band including all of the red, green, and blue wavelength bands. Accordingly, the pixels provided with the R filter, the G filter, and the B filter have main sensitivities at different wavelength bands (560 to 650 nm, 490 to 580 nm, and 430 to 510 nm) contained in the use wavelength band in which the pixels provided with the W filter have the main sensitivity. In other words, they have different spectral sensitivity characteristics.

The transmittance characteristics of the color filters illustrated in FIG. 4 are merely illustrative, and may have different transmittance characteristics.

In the following description, among all pixels in the pixel array 121, a pixel having the R filter will be referred to as an "R pixel", and a pixel having the G filter will be referred to as the "G pixel." In addition, a pixel having a B filter will be referred to as "B pixel," and R, G, and B pixels will be collectively referred to as a "colored pixel." A pixel having a W filter will be referred to as a "W pixel" as a uncolored pixel. The color filter array 122 may include an area having no color filter. The area where no color filter is provided is also treated as the "W pixel."

In the polarization color image sensor 12 having the color filter array 122 illustrated in FIG. 3, the number nc of color types that can be acquired by the colored pixels is 3, and the color C(i) (i is 1 or more and nc or less) that can be acquired by the colored pixels is an integer of C(1)=R, C(2)=G, and C(3)=B. The number i assigned to the color that can be acquired by the colored pixels is merely illustrative, and, for example, C(1)=B, C(2)=R, and C(3)=G may be used. In addition, the color C(i) that can be acquired by the colored pixels is not limited to RGB, but may be other colors. For example, instead of the three primary colors of RGB, complementary colors of cyan (C), magenta (M), yellow (Y) may be used or infrared (IR) and ultraviolet (UV) may be used. The number nc of color types that can be acquired by the colored pixel is not limited to 3, and may be, for example, nc=2 for R and B or nc=4 for CMY+IR.

Figure 5:
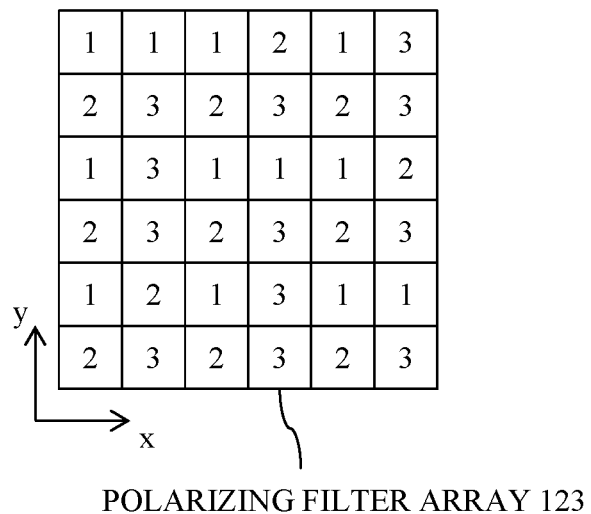
FIG. 5 illustrates an illustrative arrangement of the polarizing filter in the polarization color image sensor according to this embodiment.

FIG. 5 illustrates a specific example of the polarizing filter array 123. The x-axis and y-axis in FIG. 5 are two axes that are parallel to the pixel array 121 and orthogonal to each other. The x-axis and y-axis may be different from the direction illustrated in FIG. 5 as long as this condition is satisfied.

Each polarizing filter in the polarizing filter array 123 has a high transmittance to a polarization component of a specific polarization direction than a polarization component of another polarization direction. An angle θ (0°≤θ<180°) between the polarization direction of the polarization component having the maximum transmittance and the x axis is defined as the polarization azimuth of the polarizing filter.

In FIG. 5, the polarizing filter array 123 includes polarizing filters having three different polarization azimuths θ1, θ2, and θ3 (indicated by 1, 2, and 3 in FIG. 5, respectively). The polarizing filters having polarization azimuths θ1, θ2, and θ3 (referred to as "θ1 filter," "θ2 filter," and "θ3 filter," respectively hereinafter) are provided for one of pixels in the pixel array 121. Thereby, the pixels provided with the θ1 filter, the θ2 filter, and the θ3 filter have the main sensitivities to the polarization components having different polarization azimuths. In other words, they have different polarization sensitivity characteristics.

In the following description, a pixel having the θ1 filter among all pixels in the pixel array 121 will be referred to as a "θ1 pixel," and a pixel having the θ2 filter will be referred to as a "θ2 pixel." A pixel having the θ3 filter will be referred to as a "θ3 pixel." In addition, the θ1 pixel, the θ2 pixel, and the θ3 pixel are collectively referred to as a "polarization pixel."

The number np of types of polarization components that can be acquired by the polarization pixel is 3, and the polarization azimuth P(j) (j is an integer from 1 to np) that can be acquired by the polarization pixel is P(1)=θ1, P(2)=θ2, and P(3)=θ3. The number j assigned to the polarization azimuth that can be obtained by the polarization pixel is merely illustrative, and may be P(1)=θ2, P(2)=θ3, P(3)=θ1, for example. The polarization azimuths P(j) that can be acquired by the polarization pixels are, for example, P(1)=0°, P(2)=45°, and P(3)=90°. However, other polarization azimuths may be used, such as P(1)=0°, P(2)=60°, and P(3)=120°.

The number np of types of polarization components needs to be at least 3 in order to calculate polarization information (α, a, b) described later, but may be 4 or more. For example, np=4 may be used such as P(1)=0°, P(2)=45°, P(3)=90°, and P(4)=135°.

The polarizing filter array 123 may partially contain an area having no polarizing filter, or an area having a filter that transmits a polarization component in any polarization azimuth, and pixels corresponding to these areas will be referred to as a "non-polarization pixel."

Figures 7, 8:
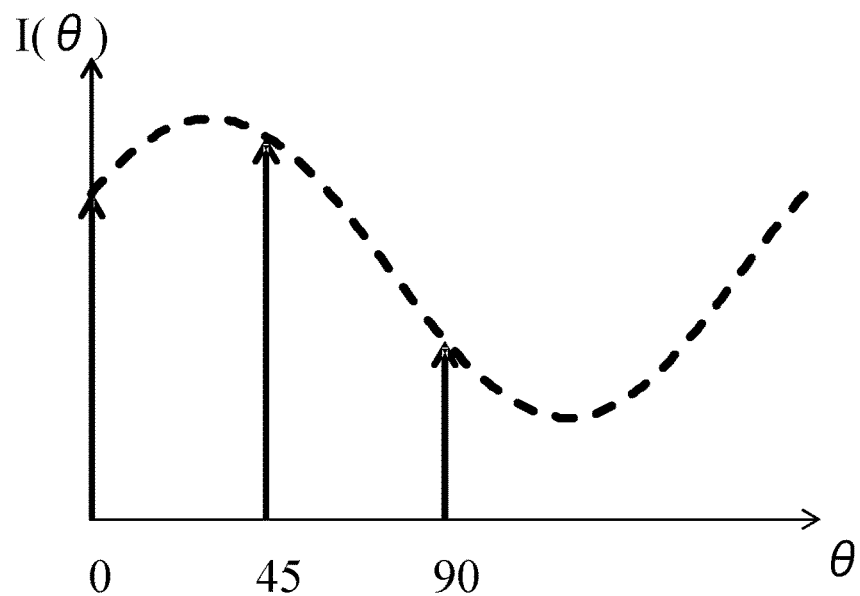
FIG. 7 illustrates an illustrative calculation of polarization information.
FIG. 8 illustrates a pixel arrangement in a polarization color image sensor according to a first embodiment.

As described above, the polarization color image sensor 12 has a plurality of types of pixel groups (each pixel group includes a plurality of pixels) in which combinations of available wavelength band light and polarization component are different from each other. More specifically, for example, where a combination of the R pixel group and the θ1 pixel group is defined as a R1 pixel group, as illustrated in FIG. 8, there are an R1 pixel group, an R2 pixel group, an R3 pixel group, a G1 pixel group, a G2 pixel group, and a G3 pixel group, a B1 pixel group, a B2 pixel group, a B3 pixel group, a W1 pixel group, a W2 pixel group, and a W3 pixel group.

The R pixel group, the G pixel group, and the B pixel group correspond to a plurality of colored pixel groups (first pixel groups), and the W pixel group corresponds to the uncolored pixel group (second pixel group). The R1 pixel group, the R2 pixel group, and the R3 pixel group correspond to a plurality of polarization pixel groups in the R pixel group. The G1 pixel group, the G2 pixel group, and the G3 pixel group correspond to a plurality of polarization pixel groups in the G pixel group. The B1 pixel group, the B2 pixel group, and the B3 pixel group correspond to a plurality of polarization pixel groups in the B pixel group. The W1 pixel group, the W2 pixel group, and the W3 pixel group correspond to a plurality of polarization pixel groups in the W pixel group.

In the above description, the color filter array 122 and the polarizing filter array 123 are separately provided to the pixel array 121. However, this embodiment is merely illustrative, and the polarization color image sensor may have a polarization color pixel array including a color filter function and a polarizing filter function as a whole. For example, a polarization color filter array having both a color filter function and a polarizing filter function may be provided to the pixel array 121. Instead of providing a color filter, a polarization color image sensor in which pixels sensitive only to light in a specific wavelength band may be used. Even in these cases, each pixel is referred to as the colored pixel or a polarization pixel corresponding to a color or polarization component to which the pixel is sensitive.

In the pixel array in the embodiments described later, square array patterns as basic array patterns such as 6×6 pixels and 8×8 pixels are repeatedly arranged in the vertical direction and the horizontal direction. The basic array pattern is not limited to the square array pattern, but may be a rectangular array pattern of N1×N2 pixels (N1 and N2 are natural numbers different from each other) or another polygon array pattern. The pixel array 121 may be a random pixel array having no basic array pattern.

Next follows a description of imaging processing and polarization information acquisition processing using the polarization color image sensor 12. As described above, the object image formed on the imaging plane of the polarization color image sensor 12 is converted into charges according to the intensity of incident light by each pixel of the polarization color image sensor 12, and the charges are read as an electric signal (pixel signal) out of the polarization color image sensor 12. The pixel signal read from the polarization color image sensor 12 is input to the information processor 13 and converted into luminance information of each pixel. The luminance information of each pixel includes color information and polarization information corresponding to the type of pixel.

In extracting color information and polarization information from a specific type of pixel among a plurality of types of pixels, a mosaic image consisting only of the color information and polarization information is obtained. The information processor 13 calculates color information and polarization information not obtained from other pixels by performing demosaic processing on the mosaic image. The information processor 13 generates image information including the calculated color information and polarization information.

In the demosaic processing performed by the information processor 13, an object image having a higher spatial frequency is reproduced as the information amount of the original mosaic image is larger. In other words, an object image having a high spatial frequency is reproduced as a ratio of the number of pixels in the pixel group having a plurality of pixels of the same type (referred to as a "pixel number ratio" hereinafter) to the total number of pixels in the polarization color image sensor 12 (referred to as a "total sensor pixel number" hereinafter) is larger. A higher spatial frequency means a higher resolution of the object image. Thus, the resolution is the highest of the object image reproduced from the color information and polarization information obtained from the type of pixel group having the largest number of pixels among the plurality of types of pixel groups included in the polarization color image sensor 12.

In the following description, the pixel that is the W pixel and is the polarization pixel will be referred to as a polarization W pixel, and a plurality of polarization W pixels will be collectively referred to as a polarization W pixel group. As described above, the image sensor 12 has a plurality of polarization W pixel groups (W1 pixel group, W2 pixel group, and W3 pixel group) having main sensitivities to polarization components with different polarization azimuths. A pixel that is the colored pixel in the same color and is the polarization pixel will be referred to as a polarization color pixel (polarization C(i) pixel), and a plurality of polarization C(i) pixels will be referred to as a polarization color pixel group or polarization C(i) pixel group. The image sensor 12 includes a plurality of polarization color pixel groups (such as the R1 pixel group, the R2 pixel group, and the R3 pixel group) having main sensitivities to polarization components with different polarization azimuths as the polarization color pixel groups in the respective colors.

In the embodiment, a (total) pixel number ratio Npw of the plurality of polarization W pixel groups to the total sensor pixel number is made larger than a (total) pixel number ratio Npc(i) of the plurality of polarization color pixel groups in each color. In other words, the following condition is satisfied for a plurality of polarization color pixel groups in each color, $$Npw > Npc(i) \tag{1}$$

The resolution of the polarization information (referred to as "color polarization information" hereinafter) obtained from a polarization color pixel group with a low pixel number ratio can be apparently improved by using the polarization information with a high resolution (referred to as "W polarization information" hereinafter) obtained from the polarization W pixel group with a high pixel number ratio.

As described above, the wavelength band to which the W pixel has the main sensitivity contains the wavelength band to which each color pixel has the main sensitivity. Hence, it is possible to apparently improve the resolution of each color polarization information by estimating the high frequency component of each color polarization information with a low resolution based on the high frequency component of the W polarization information with high resolution and by using it for demosaicing. In other words, the color polarization information in the high spatial frequency region, which cannot originally be obtained only from the color polarization information in the low spatial frequency region from the polarization color pixel, can be acquired using the W polarization information.

In order to improve the resolution of the color polarization information by the W polarization information, Npw may be larger than Npc(i) by 5% or higher. Npw may be larger than Npc(i) by 10% or higher. Npw is at least twice as large as Npc(i).

A description will now be given of an illustrative method for estimating the high frequency component of the color polarization information from the high frequency component of the W polarization information. A description will now be given of the case where the use wavelength band to which the polarization W pixel is sensitive is the entire visible light band, and the R, G, and B polarization information is acquired as color polarization information (referred to as "R polarization information," "G polarization information," and "B polarization information," respectively hereinafter). In this case, the W polarization information includes the R, G, and B polarization information. Assume that the ratios of the high frequency components of the R, G, and B polarization information are equal to each other. Then, the high frequency components of the R, G, and B polarization information included in the W polarization information are estimated to be one-third as high as the high frequency components of the W polarization information, respectively. Hence, the low frequency component and the high frequency component of the R, G, and B polarization information can be obtained by adding the low frequency component of the R, G, and B polarization information to the high frequency component of the W information multiplied by one-third.

Assume that the ratio of the high frequency components of the R, G, and B polarization information is kR: kG: kB (where kR+kG+kB=1). Then, the high frequency components of the R, G, and B polarization information may be estimated respectively as kR times, kG times, and kB times as high as the high frequency component of the W polarization information.

A pixel number ratio Nw of the W pixel group to the total sensor pixel number may be larger than a pixel number ratio Nc(i) of each color pixel group (C(i) pixel group). In other words, the following condition may be satisfied for each color pixel group:

$$Nw > Nc(i) \quad (2)$$

Satisfying the condition of the expression (2) can increase the resolution including non-polarization information that can be acquired by the non-polarization pixel.

A pixel number ratio Npw of the polarization W pixel group to the total sensor pixel number may be greater than a reciprocal of the number nc of the plurality of color pixel groups:

$$Npw > 1/nc \quad (3)$$

In this embodiment having nc=3, the expression (3) is Npw>1/3. Thereby, the resolution can be improved as compared with a case of using the image sensor in which nc types of the first pixel group having no W pixel group have pixel number ratios equal to each other.

When the pixel number ratio in each color pixel group reduces, the accuracy of obtaining the color information decreases, for example, due to the false color. Hence, a pixel number ratio Npc of the polarization color pixel to the total sensor pixel number may be 1/10 or higher or the following condition may be satisfied:

$$Npc \geq 1/10 \quad (4)$$

The image information generated by the information processor 13 is recorded in the recorder 14. The image information recorded in the recorder 14 is read out by the polarization information calculator 15 as necessary. The polarization information calculator 15 calculates polarization information ($\alpha$, a, b) representing the polarization state of the incident light. $\alpha$ is the polarization azimuth where the light intensity is maximum, a is a maximum value of the light intensity, and b is a minimum value of the light intensity.

Using the calculated polarization information ($\alpha$, a, b) can prepare a captured image (referred to as a "polarization image" hereinafter) that is different in texture or reflected light from the object, from a captured image where no polarization is acquired. A description will now be given of a relationship between the polarization information and the reflected light in preparing the polarization image.

The reflected light from the object is divided into a specular reflection component that is directly reflected on the surface of the object and a scattering component that is reflected while being scattered on or inside the object. The specular reflection component is light reflected by the surface of the object, and is reflected by satisfying the Fresnel reflection condition. In the Fresnel reflection, the intensity of the s-polarized light is higher than that of the p-polarized light except for some conditions. Thus, the specular reflection component has a tendency that the polarization intensity changes depending on the azimuth or has an azimuth dependency. On the other hand, a diffuse component has no azimuth dependency because the light incident on the object is reflected in various directions. Accordingly, among the obtained polarization intensity, a component "a-b" that changes with direction $\theta$ is regarded as a specular reflection component, and a component "b" whose intensity does not change is regarded as a scattering component. Then, the specular reflection component and the scattering component are calculated according to the purpose, and a polarization image is prepared by combining these components while changing their ratios. Thereby, a captured image can be obtained which is different in texture or reflected light from the captured image obtained when no polarization is acquired.

Figures 6A, 6B:
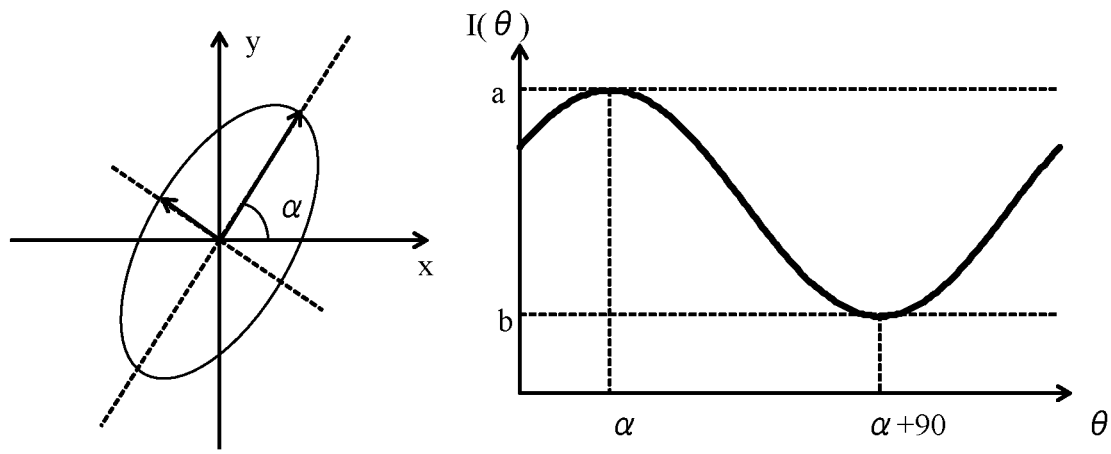
FIGS. 6A and 6B illustrate the polarization state of incident light and the light intensity relative to the incident angle.

A description will be given of a method of calculating the polarization information ($\alpha$, a, b). Assume that the incident light on the polarization color image sensor 12 can be expressed as illustrated in FIGS. 6A and 6B. An ellipse illustrated in FIG. 6A illustrates the azimuth dependency of the amplitude of the incident light. FIG. 6B illustrates the light intensity of the incident light having an angle $\theta$ relative to the x-axis or the light intensity I($\theta$) of the polarization azimuth $\theta$ of the incident light. A broken line illustrated in FIG. 6A represents a major axis and a minor axis of the ellipse, and a is an angle formed by the major axis and the x axis. Arrows represent the amplitudes in the major axis direction and the minor axis direction. Furthermore, the square of the amplitude represented by the arrow is the light intensity, which corresponds to a and b in FIG. 6B. At this time, the light intensity I(θ) is expressed by the following expression (5).

$$I(\theta)=(ab)\cos^2(\theta-\alpha)+b \qquad (5)$$

I(θ) changes at a cycle of 180° from the expression (5). Hence, in order to calculate the polarization information, it is necessary to acquire the light intensity I(θ) of at least three polarization azimuths when expressed by an angle θ of 0° or more and less than 180°. For example, FIG. 7 illustrates the light intensity of three polarization azimuths of θ=0°, 45°, and 90°, and I(θ) represented by the polarization information calculated it.

On the other hand, as long as the above condition is satisfied, there is no particular limitation on the polarization azimuth to be acquired. Thus, if the light intensities I(θ) of arbitrary three or more polarization azimuths are acquired, the polarization information (α, a, b) can be obtained. Therefore, the light intensities I(θ) of three or more polarization azimuths may be acquired for each of the W pixel and each color C(i) pixel.

In order to obtain polarization information (α, a, b) at a high resolution, the resolutions of the three light intensities I(θ) used for the calculation may be made higher. This embodiment can improve the polarization information in each color C(i) by improving the resolution of the W polarization information. In other words, in order to obtain the polarization information (α, a, b) at a high resolution, the following condition may be satisfied.

Assume that among the pixel number ratios of the plurality of polarization pixel groups having main sensitivities to polarization components having different polarization azimuths in the polarization W pixel group to the total sensor pixel number, the third largest pixel number ratio is represented by Npw(Pw(3)). Pw(n) indicates a polarization component to which the polarization pixel group has the main sensitivity which has the n-th largest pixel number ratio to the total sensor pixel number in the polarization W pixel group, and will be also referred to as nW-th polarization. Further, the third largest pixel number ratio among the plurality of polarization pixel groups having the main sensitivity to the polarization components having different polarization azimuths in each polarization color pixel group to the total sensor pixel number is represented by Ncp(Pc(3, i), i). Pc(n, i) represents a polarization component to which the polarization pixel group having the n-th largest pixel number ratio to the total sensor pixel number in the polarization C(i) pixel group has the main sensitivity or will be also referred to as nC(i)-th polarization.

At this time, Npw(Pw(3)) is larger than Npc(Pc(3, i), i).

$$Npw(Pw(3))>Npc(Pc(3,i),i)>0 \qquad (6)$$

If the pixel number ratios from the n1-th largest pixel number ratio to the n2-th largest pixel number ratio (n1≤3≤n2) are equal to each other, they are all considered to be the third largest pixel number ratio. Thus, when the second and third largest pixel number ratios are equal to each other, or when the second, third, and fourth largest pixel number ratios are equal to one another, all of them are considered to be the third largest pixel number ratio. When the pixel number ratio is the same, an order of the pixel number ratios may be determined by an arbitrary method, such as in ascending order of the polarization pixel number ratios for acquiring polarization with a smaller polarization azimuth angle.

At this time, the higher the resolutions of the three W polarization components are, the higher the resolution of the available polarization information is. Thus, the third largest pixel number ratio in the plurality of polarization pixel groups having the main sensitivity to the polarization components having different polarization azimuths in the polarization W pixel group to the total sensor pixel number may be 1/6 or higher or the following condition may be satisfied:

$$Npw(Pw(3))\geq 1/6 \qquad (7)$$

The polarization information calculated by the polarization information calculator 15 is recorded in the recorder 14. At this time, the polarization information may be singularly stored, but the polarization information may be stored in association with the image information used for the calculation.

The imaging apparatus illustrated in FIG. 2 includes the information processor 13, the recorder 14, and the polarization information calculator 15, but the imaging apparatus 1 does not necessarily include them and may be replaced with an external apparatus that has equivalent functions. For example, the image information output from the information processor 13 or the polarization information calculated by the polarization information calculator 15 may be recorded in an external recording apparatus. Further, the demosaic processing and calculation of the polarization information may be performed by the external apparatus such as a personal computer (PC) instead of the information processor 13 and the polarization information calculator 15.

Specific embodiments will be described below.

First Embodiment

FIG. 8 illustrates a polarization color pixel array of the polarization color image sensor 12 according to a first embodiment. The alphabet and the number written in each pixel (polarization light W pixel and polarization color pixel) in the figure indicate the wavelength band and polarization azimuth to which the pixel has main sensitivity, respectively. More specifically, alphabets R, G, B, and W indicate R, G, B, and W pixels, respectively, and numerals 1, 2, and 3 indicate θ1, θ2, and θ3 pixels, respectively. In other words, as described above, for example, "R1" indicates the R1 pixel serving as the R pixel and the θ1 pixel. These are the same in other embodiments described later.

In FIG. 8, a 6×6 pixel area surrounded by a thick line indicates a square array pattern which is a basic array pattern in this embodiment. In the pixel array in this embodiment, this square array pattern is repetitively arranged in the x-axis direction and the y-axis direction.

In this embodiment, the number of color C(i) types that can be acquired by the color pixel group is nc=3, and C(1)=R, C(2)=G, and C(3)=B. In addition, the number of polarization P(j) types that can be acquired by the polarization pixel group is np=3, such as P(1)=θ1=0°, P(2)=θ2=45°, and P(3)=θ3=90°. In this embodiment, the 3C(i)-th polarization and the 3 W-th polarization are polarization P(3).

Table 1 shows the pixel number ratio in each pixel group in the pixel array according to this embodiment. As shown in Table 1, the pixel number ratio in each pixel group to the total sensor pixel number satisfies the conditions expressed by the expressions (1) to (4) and (6) and (7).

This embodiment is inferior to the pixel arrangement of Comparative Example 1 described later in color resolution, because the pixel number ratio Nc in the color pixel group is as large as 1/4. However, since the pixel number ratio Npw of the polarized W pixel group is as large as 1/2, and particularly the pixel number ratio Npw(Pw(3)) of the W3 pixel group is as large as 1/4, the resolution of the W polarization information ($\alpha$, a, b) can be made higher.

Second Embodiment

FIG. 9 illustrates a polarization color pixel array of the polarization color image sensor 12 according to a second embodiment. In FIG. 9, an 8×8 pixel area surrounded by a thick line indicates a square array pattern which is a basic array pattern in this embodiment. In the pixel array in this embodiment, this square array pattern is repetitively arranged in the x-axis direction and y-axis direction.

In this embodiment, the number of color C(i) types that can be acquired by the color pixel group is nc=3, and C(1)=R, C(2)=G, and C(3)=B. The number of polarization P(j) types that can be acquired by the polarization pixel group is np=4, such as P(1)=$\theta$1=0°, P(2)=$\theta$2=45°, P(3)=$\theta$3=90°, and P(4)=$\theta$4=135°. In this embodiment, the 3C(i)-th polarization and the 3 W-th polarization are polarization P(3).

Table 2 shows the pixel number ratio in each pixel group in the pixel array according to this embodiment. As shown in Table 2, the pixel number ratio in each pixel group to the total sensor pixel number satisfies the conditions expressed by the expressions (1) to (4) and (6). However, the condition represented by the expression (7) is not satisfied.

This embodiment is inferior to the pixel arrangement the first embodiment in resolution, because the pixel number ratio Npw=1/2 of the polarization W pixel group and the pixel number ratio Npw(Pw(3))=1/8 of the W3 pixel group are small.

However, this embodiment is superior in resolution of the color information, because the pixel number ratio Npc=1/2 of the polarized color pixel group and the pixel number ratio Npc (Pc(3, i), i)=1/16 to 1/32 of the C3 (R3, G3 and B3) pixel group are large. In addition, since the number of polarization types np that can be acquired by the polarization pixel group is larger than that in the first embodiment, the calculation accuracy of the polarization information ($\alpha$, a, b) can be improved.

Third Embodiment

FIG. 10 illustrates a polarization color pixel array of the polarization color image sensor 12 according to a third embodiment. In FIG. 10, a 6×6 pixel area surrounded by a thick line indicates a square array pattern which is a basic array pattern in this embodiment. In the pixel array in this embodiment, this square array pattern is repetitively arranged in the x-axis direction and y-axis direction.

In this embodiment, the number of color C(i) types that can be acquired by the color pixel group is nc=2, and C(1)=R and C(2)=B. The number of polarization P(j) types that can be acquired by the polarization pixel group is np=4, such as P(1)=$\theta$1=0°, P(2)=$\theta$2=45°, P(3)=$\theta$3=90°, and P(4)=$\theta$4=135°. In this embodiment, the 3R-th polarization is polarization P(3), the 3B-th polarization is polarization P(1), and the 3 W-th polarization is polarization P(3).

Table 3 shows the pixel number ratio in each pixel group according to this embodiment. As shown in Table 3, the pixel number ratio in each pixel group to the total sensor pixel number satisfies the conditions expressed by the expressions (1) to (4) and (7). However, the number of polarization types that can be acquired by the R pixel is two or P(1) and P(4), and the number of polarization types that can be acquired by the B pixel is two or P(2) and P(3). Therefore, the pixel number ratios Npc(Pc(3, i), i) of the R3-th pixel group and the B3-th pixel group to the total sensor pixel number are 0, and do not satisfy the expression (6).

This embodiment is inferior to the first embodiment in color resolution, because the pixel number ratio Npc of the polarization color pixel is as small as 1/9. In addition, since there are two polarization types that can be acquired for each color, the color polarization information cannot be obtained from the expression (5). However, since the pixel number ratio Npw=8/9 of the polarization W pixel is large, the resolution is high.

Fourth Embodiment

FIG. 11 illustrates a polarization color pixel array in the polarization color image sensor 12 according to a fourth embodiment of the present invention. A 12×12 pixel area surrounded by a thick line in FIG. 11 indicates a square array pattern that is a basic array pattern of this embodiment. In the polarization color pixel array according to this embodiment, this square array pattern is repeatedly arranged in the x-axis direction and the y-axis direction. In FIG. 11, a pixel without a numeral represents a non-polarization pixel.

In this embodiment, the number of types of color C(i) that can be acquired by the color pixel group is nc=3, and C(1)=R, C(2)=G, and C(3)=B. In addition, the number of polarization P(j) types that can be acquired by the polarization pixel group is np=3, such as P(1)=$\theta$1=0°, P(2)=$\theta$2=45°, and P(3)=$\theta$3=90°. In this embodiment, the 3C(i)-th polarization and the 3 W-th polarization are polarization P(3).

Table 4 shows the pixel number ratio in each pixel group in this embodiment. As shown in Table 4, the pixel number ratio in each pixel group to the total sensor pixel number satisfies the conditions expressed by the expressions (1) to (4) and (6), but does not satisfy the condition expressed by the expression (7).

This embodiment is inferior to the first embodiment in resolution, because the pixel number ratio Npw=3/8 of the polarized W pixel group and the pixel number ratio Npw (Pw(3))=1/8 of the W3 pixel group are small. However, since the pixel number ratio Nc of the color pixel group is as large as 1/2, the color resolution is good, and since the pixel number ratio Np=Npw+Npc of the polarization pixel group is as small as 5/8, the loss of incident light is small and the sensitivity is high.

Fifth Embodiment

FIG. 12 illustrates a polarization color pixel array of the polarization color image sensor 12 according to a fifth embodiment. A 9×9 pixel area surrounded by a thick line in FIG. 12 indicates a square array pattern which is a basic array pattern in the present embodiment. In the pixel array in this embodiment, this square array pattern is repeatedly arranged in the x-axis direction and the y-axis direction.

In this embodiment, the number of color C(i) types that can be acquired by the color pixel group is nc=3, and C(1)=R, C(2)=G, and C(3)=B. The number of polarization P(j) types that can be acquired by the polarization pixel group is np=4, such as P(1)=$\theta$1=0, P(2)=$\theta$2=45°, P(3)=$\theta$3=90°, and P(4)=$\theta$4=135°. In this embodiment, the 3C(i)-th polarization and the 3 W-th polarization are polarization P(3).

Table 5 shows the pixel number ratio in each pixel group in this embodiment. As shown in Table 5, the pixel number ratio in each pixel group to the total sensor pixel number satisfies the conditions expressed by the expressions (1), (2), (4), and (6). However, the conditions expressed by the expressions (3) and (7) are not satisfied.

This embodiment is inferior to the pixel arrangement of the first embodiment in resolution, because the pixel number ratio Npw=21/81 of the polarization W pixel group and the pixel number ratio Npw(Pw(3))=7/81 of the W3 pixel group are small. However, since the pixel number ratio Npc=60/81 of the polarization color pixel group and the pixel number ratio Npc(Pc(3, i), i)=5/81 of the C3(R3, G3 and B3) pixel group are large, the resolution of the color information is good. In addition, since the number of polarization types np that can be acquired by the polarization pixel group is larger than that of the first embodiment, this embodiment can improve the calculation accuracy of the polarization information (α, a, b).

Comparative Example 1

Figures 13, 14:
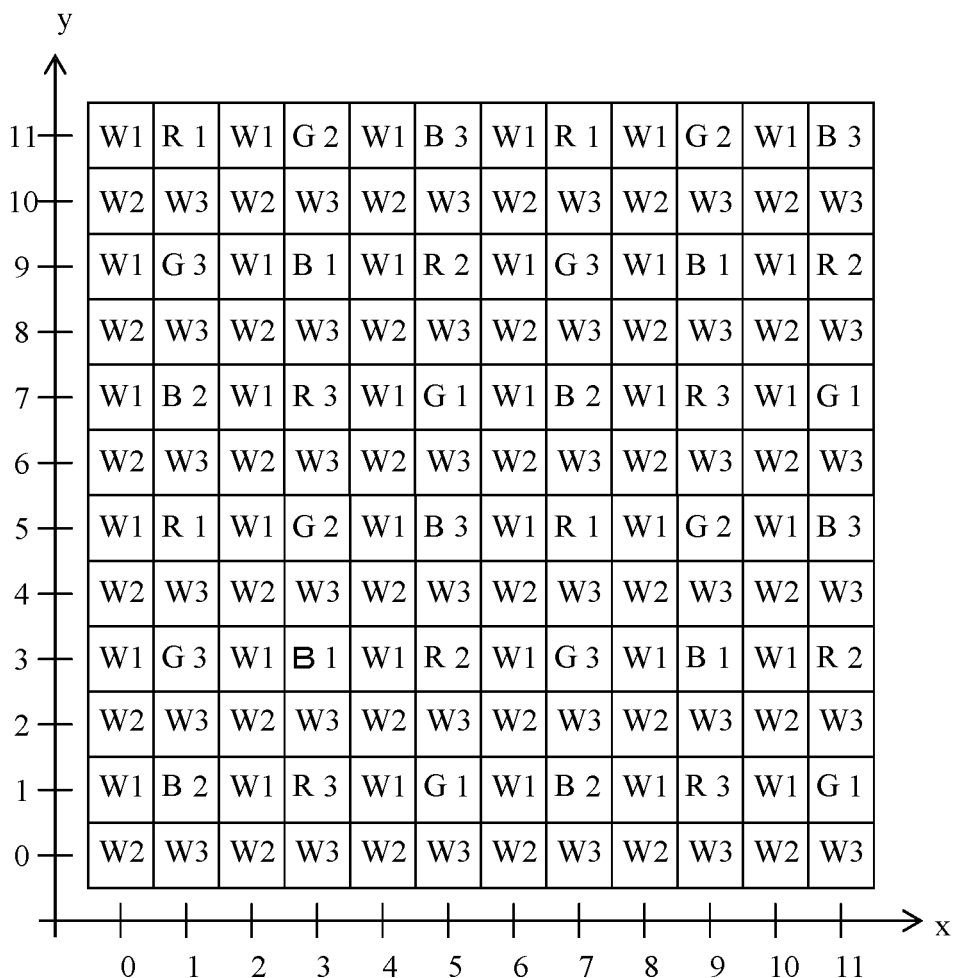
FIG. 13 illustrates coordinate settings in a polarization color image sensor.
FIG. 14 illustrates a pixel arrangement in a polarization color image sensor as a comparative example.

FIG. 14 illustrates a polarization color pixel array according to a comparative example 1 of the present invention. In FIG. 14, a 3×3 pixel area surrounded by a thick line indicates a square array pattern that is a basic array pattern in this comparative example. In the pixel array of this comparative example, this square array pattern is repeatedly arranged in the x-axis direction and the y-axis direction.

In this comparative example, the number of color C(i) types nc=3 that can be acquired by the color pixel group is C(1)=R, C(2)=G, and C(3)=B. Further, the number of polarization P(j) types that can be acquired by the polarization pixel group is np=3, such as P(1)=θ1=0°, P(2)=θ2=45°, P(3)=θ3=90°. In this comparative example, the 3C(i)-th polarization is polarization P(3).

Table 6 shows the pixel number ratio in each pixel group in this comparative example. As shown in Table 6, the pixel number ratio in each pixel group to the total sensor pixel number does not satisfy the conditions expressed by the expressions (1) to (3) and (6) and (7).

As illustrated in FIG. 14 and Table 6, according to this comparative example, all pixels are polarization color pixels and do not have polarization W pixels. In addition, the pixel arrangement of the polarization pixel group and the color pixel group is a uniform pixel arrangement.

Since this comparative example has no W pixels unlike the first to fifth embodiments, the resolution is determined by the combination having the largest pixel number ratio to the total sensor pixel number among the combinations of the polarization pixel group and the color pixel group. In other words, the pixel number ratio Npc(i) of the polarization C(i) pixel group is 1/3. Since this ratio is smaller than Npw in the first to fifth embodiments, this comparative example is inferior to the first to fifth embodiments in resolution of the polarization information. On the other hand, since Npc(i) of this comparative example is larger than Npc(i) in the first to fifth embodiments, the color resolution is high.

Sixth Embodiment

The polarization color image sensor 12 according to each of the above embodiments can be mounted on the imaging apparatus 1 illustrated in FIG. 2. A description will now be given of the illustrative demosaic processing performed by the information processor 13 in the image sensor 1 mounted with the polarization color image sensor 12 according to the first embodiment.

FIG. 13 illustrates the xy coordinate for the polarization color pixel arrangement according to the first embodiment illustrated in FIG. 8 such that the coordinate of the lower left pixel in the drawing is set to (0, 0) and the coordinate of the upper right pixel is set to (11, 11). Hereinafter, the information on the polarization P(j) of W or color C(i) at the coordinates (x, y) is expressed as Wj(x, y) or C(i)j(x, y). For example, information of color C(3)=B and polarization P(3)=90° at the coordinate (1, 2) is expressed as B3(1, 2).

In this demosaicing processing, the W polarization information at a high resolution is first interpolated, and then the color polarization information is then interpolated using the interpolated W polarization information. A description will be given of the interpolation of the W polarization information.

The interpolation of defective W polarization information in each pixel is divided into four cases where the pixel to be interpolated is a W1 pixel, a W2 pixel, a W3 pixel, and a polarization color pixel. In the W1 pixel, the defective W polarization information is W2 polarization information (referred to as W2 information hereinafter) and W3 polarization information (referred to as W1 information hereinafter). The pixels around the W1 pixel include two (or upper and lower) W2 pixels, and four (or upper left, lower left, upper right, and lower right) W3 pixels. Thus, the W2 information and the W3 information for the W1 pixel are calculated as an average value of the W2 information and the W3 information that can be acquired from the surrounding W2 and W3 pixels. In other words, it is obtained by the following expressions (8) and (9):

$$W2(x, y) = \frac{1}{2} \sum_{ny=1,-1} W2(x, y+ny) \quad (8)$$

$$W3(x, y) = \frac{1}{4} \sum_{\substack{nx=1,-1 \\ ny=1,-1}} W3(x+nx, y+ny) \quad (9)$$

In the expressions (8) and (9), x and y express a coordinate of the W1 pixel to be interpolated, and are represented by x=2m and y=2n+1 (m and n are integers), respectively.

In the W2 pixel, the defective W polarization information is the W1 polarization information (referred to as W1 information hereinafter) and W3 polarization. The pixels around the W2 pixel include two (or upper and lower) W1 pixels, and two (or left and right) W3 pixels. Thus, the W1 information and the W3 information for the W2 pixel are calculated as an average value of the W1 information and the W3 information that can be acquired from the surrounding W1 and W3 pixels. In other words, it is obtained by the following equations (10) and (11).

$$W1(x, y) = \frac{1}{2} \sum_{ny=1,-1} W1(x, y+ny) \quad (10)$$

$$W3(x, y) = \frac{1}{2} \sum_{nx=1,-1} W3(x+nx, y) \quad (11)$$

In the expressions (10) and (11), x and y express a coordinate of the W2 pixel to be interpolated, and are represented by x=2m and y=2n (m and n are integers), respectively.

In the W3 pixel, the defective W polarization information includes the W1 information and the W2 information. The pixels around the W3 pixel include four (or upper left, lower left, upper right, and lower right) W1 pixels, and two (or left and right) W2 pixels. Thus, the W1 information and the W2 information in the W3 pixel are calculated as an average value of the W1 information and the W2 information that can be acquired by the surrounding the W1 and W2 pixels. In other words, it is obtained by the following expressions (12) and (13).

$$W1(x, y) = \frac{1}{4} \sum_{\substack{nx=1,-1 \\ ny=1,-1}} W1(x+nx, y+ny) \tag{12}$$

$$W2(x, y) = \frac{1}{2} \sum_{nx=1,-1} W2(x+nx, y) \tag{13}$$

In the expressions (12) and (13), x and y are the coordinates of the W3 pixel to be interpolated, and are expressed by x=2m+1 and y=2n (m and n are integers), respectively.

The W1 information, the W2 information, and the W3 information are missing in polarized color pixel. Among the pixels around the polarization color pixel, two (or left and right) pixels are W1 pixels, four (or upper left, lower left, upper right, and lower right) pixels are W2 pixels, and two (upper and lower) pixels are W3 pixels. Thus, the W1 information, the W2 information, and the W3 information in the polarized color pixel are calculated as average values of the W1 information, the W2 information, and the W3 information that can be acquired by the surrounding W1, W2, and W3 pixels. In other words, it is obtained by the following expressions (14), (15), and (16).

$$W1(x, y) = \frac{1}{2} \sum_{nx=1,-1} W1(x+nx, y) \tag{14}$$

$$W2(x, y) = \frac{1}{4} \sum_{\substack{nx=1,-1 \\ ny=1,-1}} W2(x+nx, y+ny) \tag{15}$$

$$W3(x, y) = \frac{1}{2} \sum_{ny=1,-1} W3(x, y+ny) \tag{16}$$

However, in the expressions (14), (15), and (16), x and y express a coordinate of the color pixel to be interpolated, and are represented by x=2m+1 and y=2n+1 (m and n are integers), respectively. Through the above interpolation, the W polarization information can be provided to all pixels.

Next follows a description of the interpolation of the color polarization information. A description will be given of the interpolation of the R1 polarization information (referred to as "R1 information" hereinafter and the same applies to other color polarization information) of a pixel located at a coordinate (x+Δx, y+Δy) (where Δx and Δy are integers of 0 to 5 except Δx=Δy=0) when the coordinate (x, y) expresses the R1 pixel.

When the coordinate (x, y) expresses the R1 pixel, pixels located at coordinates (x+6, y), (x, y+6) and (x+6, y+6) are also R1 pixels. The ratio between the R1 information of each of these four R1 pixels and the W1 information and the W1 information of the pixel located at the coordinate (x+Δx, y+Δy) are used to calculate R1(x+Δx, y+Δy), which is the R1 information of the pixel located at the coordinate (x+Δx, y+Δy). More specifically, R1(x+Δx, y+Δy) is calculated so that the average value of the four ratios is equal to the ratio of R1(x+Δx, y+Δy) and W1(x+Δx, y+Δy). In other words, the R1 information is calculated by the following expression:

$$R1(x+\Delta x, y+\Delta y) = \tag{17}$$

$$\begin{cases} \dfrac{W1(x+\Delta x, y+\Delta y)}{2} \sum_{ny=0,6} \dfrac{R1(x, y+ny)}{W1(x, y+ny)} & (\Delta x = 0) \\[2ex] \dfrac{W1(x+\Delta x, y+\Delta y)}{2} \sum_{ny=0,6} \dfrac{R1(x+nx, y)}{W1(x+nx, y)} & (\Delta y = 0) \\[2ex] \dfrac{W1(x+\Delta x, y+\Delta y)}{4} \sum_{\substack{nx=0,6 \\ ny=0,6}} \dfrac{R1(x+nx, y+ny)}{W1(x+nx, y+ny)} & (\Delta x \neq 0 \text{ AND } \Delta y \neq 0) \end{cases}$$

The R1 information of all pixels can be calculated based on the expression (17). The remaining colors are calculated in the same way as the interpolation of the R1 information described above. For example, the G2 polarization information can be interpolated by replacing the R1 information of the R1 pixel with the G2 information of the G2 pixel and the W1 information with the W2 information in the same manner as the interpolation of the R1 information.

The above interpolation can provide all polarization information in each color to all pixels. Further, the resolution of the color polarization information can be improved by using the W polarization information at a high resolution for the interpolation of the color polarization information.

The interpolation method described so far is merely illustrative, and other various interpolation methods are applicable. For example, while the above interpolation of the W polarization information is performed by simple averaging, the bicubic interpolation may be performed instead. For the interpolation of the color polarization information, a difference may be used instead of the ratio of color polarization information and W polarization information. Instead of the simple average of the ratios, a weighted average may be made with a weight of the reciprocal of the distance between pixels.

TABLE 1

| First Embodiment | | | | | |
|---|---|---|---|---|---|
| Nw | 3/4 | Npw | 3/4 | Npw(Pw(3)) | 1/4 |
| Nc | 1/4 | Npc | 1/4 | | |
| Nc(1) | 1/12 | Npc(1) | 1/12 | Npc(Pc(3, 1), 1)) | 1/36 |

TABLE 1-continued

First Embodiment

| Nc(2) | 1/12 | Npc(2) | 1/12 | Npc(Pc(3, 2), 2)) | 1/36 |
| Nc(3) | 1/12 | Npc(3) | 1/12 | Npc(Pc(3, 3), 3)) | 1/36 |

TABLE 2

Second Embodiment

| Nw | 1/2 | Npw | 1/2 | Npw(Pw(3)) | 1/8 |
| Nc | 1/2 | Npc | 1/2 | | |
| Nc(1) | 1/4 | Npc(1) | 1/4 | Npc(Pc(3, 1), 1)) | 1/16 |
| Nc(2) | 1/8 | Npc(2) | 1/8 | Npc(Pc(3, 2), 2)) | 1/32 |
| Nc(3) | 1/8 | Npc(3) | 1/8 | Npc(Pc(3, 3), 3)) | 1/32 |

TABLE 3

Third Embodiment

| Nw | 8/9 | Npw | 8/9 | Npw(Pw(3)) | 2/9 |
| Nc | 1/9 | Npc | 1/9 | | |
| Nc(1) | 1/18 | Npc(1) | 1/18 | Npc(Pc(3, 1), 1)) | 0 |
| Nc(2) | 1/18 | Npc(2) | 1/18 | Npc(Pc(3, 2), 2)) | 0 |
| Nc(3) | | Npc(3) | | Npc(Pc(3, 3), 3)) | |

TABLE 4

Fourth Embodiment

| Nw | 1/2 | Npw | 3/8 | Npw(Pw(3)) | 1/8 |
| Nc | 1/2 | Npc | 1/4 | | |
| Nc(1) | 1/6 | Npc(1) | 1/12 | Npc(Pc(3, 1), 1)) | 1/36 |
| Nc(2) | 1/6 | Npc(2) | 1/12 | Npc(Pc(3, 2), 2)) | 1/36 |
| Nc(3) | 1/6 | Npc(3) | 1/12 | Npc(Pc(3, 3), 3)) | 1/36 |

TABLE 5

Fifth Embodiment

| Nw | 21/81 | Npw | 21/81 | Npw(Pw(3)) | 7/81 |
| Nc | 60/81 | Npc | 60/81 | | |
| Nc(1) | 20/81 | Npc(1) | 20/81 | Npc(Pc(3, 1), 1)) | 5/81 |
| Nc(2) | 20/81 | Npc(2) | 20/81 | Npc(Pc(3, 2), 2)) | 5/81 |
| Nc(3) | 20/81 | Npc(3) | 20/81 | Npc(Pc(3, 3), 3)) | 5/81 |

TABLE 6

Comparative Example 1

| Nw | 0 | Npw | 0 | Npw(Pw(3)) | 0 |
| Nc | 1 | Npc | 1 | | |
| Nc(1) | 1/3 | Npc(1) | 1/3 | Npc(Pc(3, 1), 1)) | 1/9 |
| Nc(2) | 1/3 | Npc(2) | 1/3 | Npc(Pc(3, 2), 2)) | 1/9 |
| Nc(3) | 1/3 | Npc(3) | 1/3 | Npc(Pc(3, 3), 3)) | 1/9 |

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can provide an image sensor capable of acquiring polarization information and color information at a high resolution, and an image sensor using the image sensor.

What is claimed is:

1. An image sensor with two-dimensionally arranged pixels, the image sensor comprising:
    a plurality of first pixel groups each having a main sensitivity to light of a corresponding one of a plurality of wavelength bands; and
    a second pixel group having the main sensitivity to a wavelength band including the plurality of wavelength bands,
    wherein each of the plurality of first pixel groups and the second pixel group includes a plurality of polarization pixel groups having the main sensitivity to each of polarization components having three or more polarization azimuths, and
    wherein a ratio of the number of pixels in the plurality of polarization pixel groups in the second pixel group to a total number of pixels on the image sensor is larger than a ratio of the number of pixels in the plurality of polarization pixel groups in each of the plurality of first pixel groups to the total number of pixels.

2. The image sensor according to claim 1, wherein the ratio of the number of pixels in the plurality of polarization pixel groups in the second pixel group to the total number of pixels is larger than the ratio of the number of pixels of the plurality of polarization pixel groups in each of the plurality of first pixel groups to the total number of pixels by 5% or higher.

3. The image sensor according to claim 1, wherein the ratio of the number of pixels in the second pixel group to the total number of pixels is larger than the ratio of the number of pixels in each of the plurality of first pixel groups to the total number of pixels.

4. The image sensor according to claim 1, wherein the ratio of the number of pixels in the second pixel group to the total number of pixels is higher than 1/3.

5. The image sensor according to claim 1, wherein the ratio of the number of pixels in the plurality of polarization pixel groups included in all of the plurality of first pixel groups to the total number of pixels is 1/10 or higher.

6. The image sensor according to claim 1, wherein a third largest ratio among ratios of the number of pixels in the plurality of polarization pixel groups in the second pixel group to the total number of pixels is larger than the ratio of the number of pixels in the plurality of polarization pixel groups in each of the plurality of first pixel groups to the total number of pixels.

7. The image sensor according to claim 6, wherein the third largest ratio among the ratios of the number of pixels in the plurality of polarization pixel groups in the second pixel group to the total number of pixels is 1/6 or higher.

8. The image sensor according to claim 1, wherein the plurality of wavelength bands to which the plurality of first pixel groups have main sensitivities are wavelength bands of red, green, and blue.

9. An imaging apparatus comprising:
an image sensor with two-dimensionally arranged pixels, and
a generator configured to generate image information using a signal output from the image sensor,
wherein the image sensor includes:
a plurality of first pixel groups each having a main sensitivity to light of a corresponding one of a plurality of wavelength bands;
a second pixel group having the main sensitivity to a wavelength band including the plurality of wavelength bands,
wherein each of the plurality of first pixel groups and the second pixel group includes a plurality of polarization pixel groups having the main sensitivity to each of polarization components having three or more polarization azimuths, and
wherein a ratio of the number of pixels in the plurality of polarization pixel groups in the second pixel group to a total number of pixels on the image sensor is larger than a ratio of the number of pixels in the plurality of polarization pixel groups in each of the plurality of first pixel groups to the total number of pixels.

* * * * *